US009923989B2

(12) United States Patent
Zourzouvillys

(10) Patent No.: US 9,923,989 B2
(45) Date of Patent: Mar. 20, 2018

(54) CUSTOMIZING NETWORK-LEVEL SETTINGS FOR A NETWORK DEVICE ON A COMMUNICATION NETWORK

(71) Applicant: Jive Communications, Inc., Orem, UT (US)

(72) Inventor: Theo Peter Zourzouvillys, Orem, UT (US)

(73) Assignee: JIVE COMMUNICATIONS, INC., Orem, UT (US)

(*) Notice: Subject to any disclaimer, the term of this patent is extended or adjusted under 35 U.S.C. 154(b) by 0 days.

(21) Appl. No.: 14/335,215

(22) Filed: Jul. 18, 2014

(65) Prior Publication Data
US 2015/0319035 A1 Nov. 5, 2015

Related U.S. Application Data

(60) Provisional application No. 61/986,757, filed on Apr. 30, 2014.

(51) Int. Cl.
H01L 29/08 (2006.01)
H04L 29/08 (2006.01)
H04L 12/24 (2006.01)
H04L 29/12 (2006.01)
H04M 7/00 (2006.01)
H04L 29/06 (2006.01)

(52) U.S. Cl.
CPC ........ H04L 67/303 (2013.01); H04L 41/0668 (2013.01); H04L 61/2007 (2013.01); H04L 65/1006 (2013.01); H04L 67/34 (2013.01); H04M 7/0075 (2013.01); H04L 61/303 (2013.01); H04L 61/306 (2013.01); H04M 7/0081 (2013.01)

(58) Field of Classification Search
CPC ............ H04L 41/0668; H04L 61/2007; H04L 65/1006; H04L 61/6004; H04M 7/0075; H04W 8/26
See application file for complete search history.

(56) References Cited

U.S. PATENT DOCUMENTS

| 8,279,853 | B1 | 10/2012 | Breau et al. |
| 8,335,210 | B1 | 12/2012 | Breau et al. |
| 2006/0013150 | A1 | 1/2006 | Park et al. |
| 2008/0062917 | A1* | 3/2008 | Oguchi ................. H04L 67/14 370/328 |

(Continued)

FOREIGN PATENT DOCUMENTS

WO  WO 2015/167727  11/2015

OTHER PUBLICATIONS

International Search Report & Written Opinion issued in PCT/US2015/023156 dated Jul. 7, 2015.

Primary Examiner — Jackie Zuniga Abad
(74) Attorney, Agent, or Firm — Keller Jolley Preece

(57) ABSTRACT

The present application describes methods and systems for improving user communication in a network-based communication system. In one or more embodiments, a datacenter provides a unique connection address network device that connects to the datacenter. By providing a unique connection address, the datacenter can provide customized network-level settings on a per network device basis. In addition, the datacenter can also provide customized network identification on a per network device basis.

20 Claims, 9 Drawing Sheets

(56) References Cited

U.S. PATENT DOCUMENTS

| | | | |
|---|---|---|---|
| 2012/0294259 A1* | 11/2012 | Breau | H04L 61/2007 370/329 |
| 2013/0155964 A1* | 6/2013 | Miller | H04L 47/724 370/329 |
| 2013/0166703 A1* | 6/2013 | Hammer | H04L 41/50 709/220 |
| 2013/0315246 A1 | 11/2013 | Zhang et al. | |
| 2014/0003354 A1 | 1/2014 | Ekici et al. | |

* cited by examiner

| Network Device Identifier 402 | Shared Component 404 | Exclusive Component 406 | Hostname 408 | Retry Timer 410 | Retry Count 412 | Certificate Identification 414 |
|---|---|---|---|---|---|---|
| 1 | 123.23.123.10 | 100 | system-provider.net | 0.5 second | 1 | Cert. ID 1 |
| 2 | 123.23.123.10 | 200 | white-label.com | 0.5 second | 1 | Cert. ID 2 |
| 3 | 123.23.123.10 | 300 | white-label.com | 1.0 second | 1 | Cert. ID 3 |
| 4 | 123.23.123.10 | 400 | white-label.com | 2 seconds | 2 | Cert. ID 1 |
| ... | ... | ... | ... | ... | ... | ... |
| n | 123.23.123.10 | p | white-label-n.com | t seconds | k | Cert. ID i |

| Port Number 420 | Network Device Identifier 422 | Hostname 424 | White Label Entity 426 | Retry Timer 428 | Retry Count 430 | Certificate Identification 432 |
|---|---|---|---|---|---|---|
| 1000 | 1, 2, 3, 4, 5 | system-provider.net | None | 2.0 seconds | 2 | Cert. ID 1 |
| 2000 | 6, 7, 8, 9, 10, 11, 12 | white-label1.com | White Label 1 | 1.5 seconds | 2 | Cert. ID 2 |
| 3000 | 20 | white-label2.com | White Label 2 | 1.0 second | 1 | Cert. ID 4 |
| 4000 | n/a | white-label2.com | White Label 2 | 1.0 second | 2 | Cert. ID 1 |
| ... | ... | ... | ... | ... | ... | ... |
| p | n-2, n-1, n | white-label-x.com | White Label x | t seconds | k | Cert. ID i |

# CUSTOMIZING NETWORK-LEVEL SETTINGS FOR A NETWORK DEVICE ON A COMMUNICATION NETWORK

CROSS REFERENCE TO RELATED APPLICATIONS

This application claims priority to and the benefit of U.S. Provisional Application No. 61/986,757 filed Apr. 30, 2014, entitled "Customizing Network-level Settings for a Network Device on a Communication Network." The entire contents of the foregoing application are hereby incorporated by reference in their entirety.

BACKGROUND

1. Technical Field

One or more embodiments of the present disclosure relate generally to facilitating communications over a network. More specifically, one or more embodiments disclosed herein relate to customizing a network-based communication system.

2. Background and Relevant Art

Advances in electronic communication technologies have interconnected people and allowed for better communication than ever before. To illustrate, users traditionally relied on a public switched telephone network ("PSTN") to speak with other users in real-time. Now, users may communicate using network-based or Internet-based communication systems. One such network-based system is an Internet Protocol ("IP") telephone system, such as a voice over IP ("VoIP") communication system.

Conventional network-based communication systems commonly rely on a central datacenter to provide communication services for each network device. For example, the central datacenter can provide VoIP services, such as facilitating VoIP communication sessions (e.g., voice and video calls), to one or more network devices. In addition, in many conventional network-based communication systems a backup datacenter provides an available option to restore the communication services in the event the central datacenter fails (e.g., network failure, hardware failure, datacenter maintenance).

A number of disadvantages exist with respect to conventional network-based communication systems. For example, in many conventional network-based communication systems, the majority, if not all, of the network devices connect to the central datacenter using a single connection address. For instance, when a network device is first powered on or initiated, the network device queries the network-based system for the connection address to the central datacenter. Once the network device connects to the central datacenter using the connection address, the network-based system can register the network device and provide communication services to the network device. This process is generally repeated for each network device that registers with the system, or in other words, each network device connects to the central database using the same connection address.

Due, at least in part, to multiple network devices connecting to the central datacenter using the same connection address, the variety of network-level settings the central datacenter provides with respect to each network device can be limited. For example, a typical datacenter may configure many network-level settings at a connection address level. For example, network-level settings may include signaling protocol settings, such as the amount of time a retry timer runs before expiring, or the number of retry attempts before a network device times out. As such, each network device connected to the central datacenter using the connection address may share the same network-level settings.

Not all types of network devices, however, operate equally given a single defined set of network-level settings. For instance, network device types can include fixed-line network devices, Wi-Fi network devices, satellite network devices, mobile devices, etc. As an example, a each of the network device types can operate optimally with a specific retry timer time that corresponds to the specific network device type. Unfortunately, in conventional network-based communication systems, only one retry timer time can be set for all network devices connected using the connection address. Thus, in many conventional network-based communication systems, individual network devices operate using network configuration settings that are not optimal for each individual network device.

An additional disadvantage with network-level settings being defined at the connection level is that each network device connected using the single connection address receives identical identification information from the central datacenter. However, in many conventional network-based communication systems, oftentimes there is more than one entity selling communication services provided by the same central datacenter, each desiring to send customized identification information to customers. For example, a conventional network-based communication system provider (hereafter "system provider") often licenses communication services to third-party white label entities (e.g., a company that sales communication services that the company does not provide itself). In other words, the system provider allows the white label entity to sell communication services provided by the central datacenter.

In particular, customers often view a system provider and a white label entity as competitors. As such, confusion may result if a customer purchases communication services from a white label entity, but instead sees the system provider brand in the datacenter identification information provided in connection with the customer's communication services. For example, network devices can display branding information, often in the form of a hostname. As such, customer confusion may result when a customer sees the system provider's hostname on their network device, when in fact, the customer contracted with a white label entity. In addition, a customer discovering that they are actually contracting with a white label entity, rather than the system provider, may prompt questions, require increased customer service, and potentially a lead to a lost customer for the white label entity. For example, the customer may decide to directly subscribe to the system provider to receive the same communication services.

In an attempt to solve the white-label branding issue, many conventional network-based communication systems use a generic hostname. However, a generic hostname itself may lead to an increase in customer confusion. In addition, the generic hostname solution suffers the drawback that neither the system provider nor the white label entity can identify their brand with the hostname. Furthermore, to maximize the profit, many system providers generally license communications services to several white-label entities so as to utilize system resources as fully as possible. However, as the number of white labels increase, and as customer numbers increase, the lack of branding issue magnifies.

In addition to the branding disadvantage, conventional network-based communication systems may be more prone to security attacks. For example, because every network device is connected to the central datacenter using a single connection address, an attack on the central datacenter may halt all communications over the connection address. For instance, a denial of service attack to the connection address blocks the datacenter from providing communication services to any network device connected to the datacenter.

Accordingly, there are a number of considerations to be made in improving the customizing network-level settings provided to a network device on a network-based communication system.

BRIEF SUMMARY

Embodiments disclosed herein provide benefits and/or solve one or more of the foregoing or other problems in the art with systems and methods that customize network-level settings provided to a network device on a communication network. In particular, example embodiments include systems and methods that allow a datacenter to provide network-level settings on a per network device basis. In one or more embodiments, the systems and methods disclosed herein allow a datacenter to assign each network device a unique connection address, and associate customized network-level settings with each unique connection address.

In one or more embodiments, the systems and methods disclosed herein can provide network-level settings to a network device customized specifically to the network device. For example, the datacenter can associate a unique connection address with network-level settings specific to a network device such that the network device is provided with optimal network-level settings. Accordingly, each network device that is provided a unique connection address by the datacenter may be connected to the datacenter using a connection address that provides optimal network-level settings tailored to each network device.

Further, in some example embodiments, the systems and methods disclosed herein can provide customized branding on a per network device basis. For instance, the datacenter can provide branding information to a network device using a connection address. For example, when a network device is connected to the datacenter using the connection address, the network device may display a hostname associated with a system provider brand or a white label brand. In other words, the connection address may be associated with a brand in the form of a hostname. In this manner, each connection address can be associated with a different hostname. Accordingly, different network devices can display different hostnames even though the different network devices are connected to the same datacenter.

Additional features and advantages disclosed herein will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the present disclosure can be obtained, a more particular description of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings in which:

FIGS. 4A-4B illustrate example data tables used in the network-based communication system of FIG. 3 in accordance with one or more embodiments disclosed herein;

DETAILED DESCRIPTION

Figure 1:
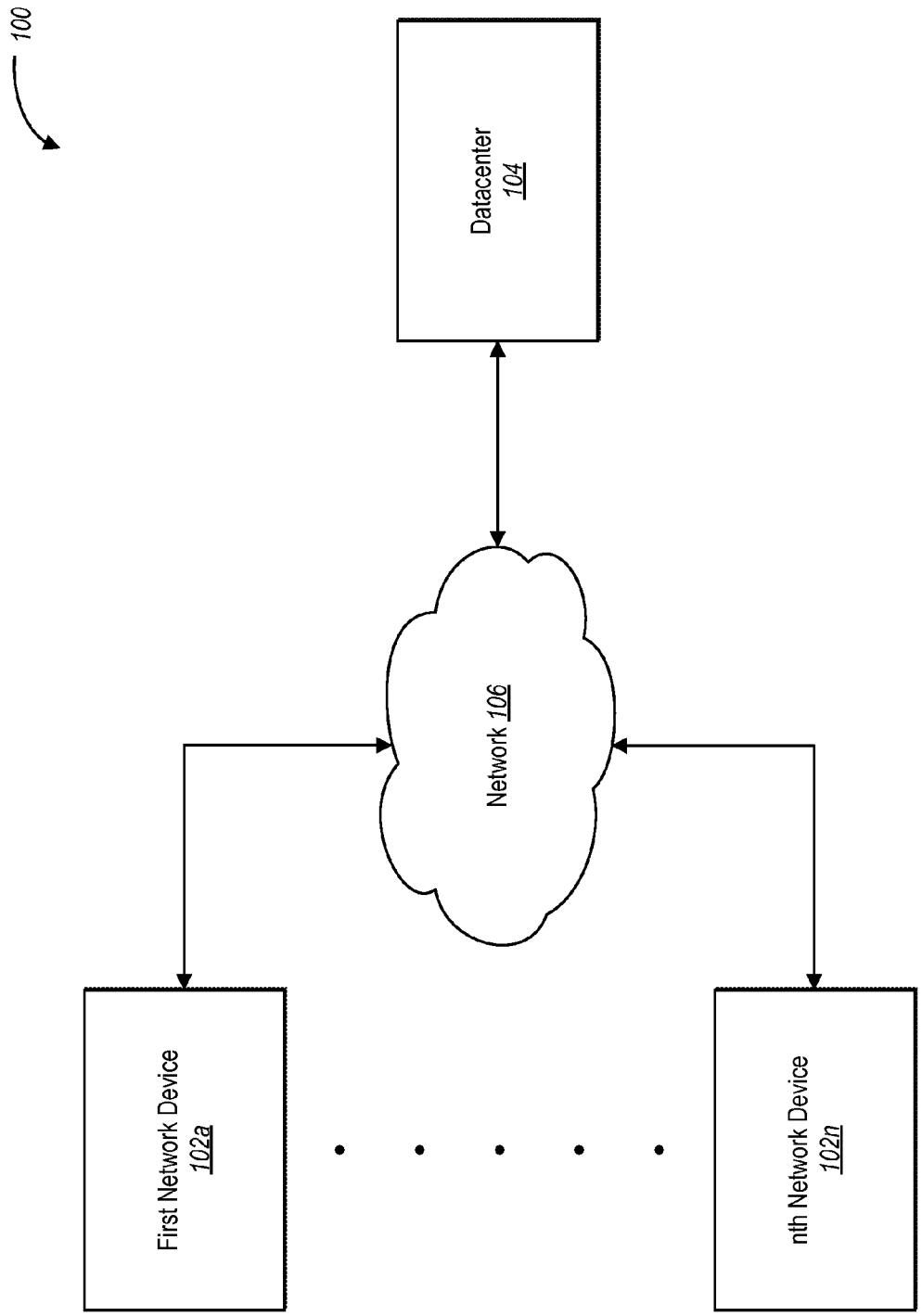
FIG. 1 illustrates a network-based communication system in accordance with one or more embodiments disclosed herein.

Embodiments disclosed herein provide benefits and/or solve one or more of the abovementioned problems or other problems in the art with providing customized services per network device on a network-based communication system. In particular, one or more example embodiments include a network-based communication system that allows a datacenter to provide customized network-level settings to a network device. For example, one or more embodiments include a network-based communication system that allows multiple network devices to each connect with the datacenter using a unique connection address.

The network-based communication system can set customized network-level settings for each unique connection address, thereby providing customized network-level settings for each network device. For example, a network-based communication system can include one network device connected to a datacenter using a connection addresses. In addition, the network-based communication system can include a second network device connected to the same datacenter using a second connection address. Accordingly, the multiple connection addresses allow the network-based communication system to provide customized network-level settings associated with each connection address, which in turn allows the network-based communication system to provide customized network-level settings on a per network device level.

In particular, the network-based communication system can accommodate multiple network devices having various connection needs. For example, when a network device connects to the datacenter using a specific connection address, the network-based communication system may determine optimal network-level settings for the network device. For instance, the network-based communication system may determine that a network device is a satellite network device, customize network-level settings optimized for a satellite network device, and associate the customized network-level settings with a unique connection address. The network-based communication system may then assign the satellite network device to use the unique connection address. In a similar manner, the network-based communication system may customize network-level settings for a Wi-Fi network device, a fixed-line network device, a mobile network device, etc. Accordingly, the network-based communication system may customize network-level settings, such as signal protocol settings, specifically for each network device on the network-based communication system.

In addition to device specific network-level settings, a network-based communication system can provide customized branding information to each device. For instance, the network-based communication system can provide a different hostname to each network device. In particular, the network-based communication system can provide each network device with a hostname associated with the system provider brand, or a white label brand, rather than providing a generic and/or unrecognizable hostname. For example, the network-based communication system allows white labels to provide their own hostnames to white label customers even though its customers are connected to the system provider's datacenter. In this manner, customers of each white label brand believe that they are connected directly to the white label entity system, reducing confusion and increasing customer confidence.

Further, the network-based communication system provides increased security to the network-based communication system. For example, the effects of denial of service attacks are reduced. In particular, because each network device is connected to the datacenter using a unique connection address, a successful denial of service attack, at most, temporarily impedes one network device rather than every network device connected to the datacenter. Additional security benefits will also be described below.

In some example embodiments, the network-based communication system can also detect, allow, or deny service to a network device. For example, if a network device is associated with a customer that is behind in payments, or has canceled service, the network-based communication system can shut down all services provided on the connection address assigned to the network device. Similarly, the network-based communication system may dynamically modify network-level settings for a specific network device upon the customer associated with the specific network device requesting a change in service. As described herein, the network-based communication system can provide adjustments to the network-level settings for a single network device without needing to change the network-level settings for all network devices connected to the datacenter.

Additional advantages and benefits of the system will become apparent in view of the below description. In particular, one or more embodiments will be described below with reference to one or more figures. In addition, the following definitions of terms will be used to describe one or more features of the system.

As used herein, the term "datacenter" refers generally to one or more computing devices that facilitate communication sessions between network devices. In one or more embodiments, a datacenter refers to a facility that houses computer systems and associated components, such as telecommunication and storage systems. For example, one of skill on the art will appreciate that a datacenter may comprise a single computing device that facilitates communication between two or more network devices, or that a datacenter may comprise a building housing computers, servers, and other components facilitating communication for thousands of network devices. Further, a datacenter may be an outbound proxy.

In addition, the term "network device" as used herein refers generally to a computing device that facilitates a communication session. A network device can communicate with a datacenter and other network devices. A variety of network devices may employ VoIP technology, such as personal computers, handheld devices, mobile phones, smartphones, and other electronic access devices. As an example, a network device may be a dedicated VoIP device or soft VoIP device. Dedicated and soft devices are described in greater detail below in connection with FIGS. 7-8.

As used herein, the term "communication session," refers generally to a communication interaction between one or more network devices that occurs over a communication network. For example a communication session may include voice or video calling, video conferencing, streaming multimedia distribution, instant messaging, presence information sharing, file transferring, faxing over IP, and online gaming. For instance, a session may be part of the session initiation protocol ("SIP"), which is a signaling communications protocol commonly used in network-based communication systems. Likewise, a session may refer to a communication session using other protocols common to IP peer communications.

As used herein, the term "connection" refers generally to an established communication link between at least two computing devices. For instance, two or more network devices connect to, or with, each other when each network device acknowledges the connection with the other network device(s). For example, as further described below, a connection between a network device and a datacenter may occur when the network device is mapped to and registers with the datacenter. A connection can include one or more types of connections, such as a switched circuit connection, a virtual circuit connection, or a network connection. For example, a connection between multiple network devices occurs over a network, such as the Internet, and data sent between the multiple network devices via the connection may employ various network paths.

Although the disclosure discusses one or more example embodiments in reference to VoIP telephone network-based communication systems, it should be understood that the principles, systems, and methods disclosed herein may also be effectively used in other types of packet-based IP communication networks and unified (e.g., real-time) communication systems. For instance, the principles described may be used for sending faxes, text messages, and voice-messages over a network-based communication system.

FIG. 1, for example, illustrates a network-based communication system 100 (or simply "system 100") in accordance with one or more embodiments disclosed herein. As illustrated by FIG. 1, the system 100 may include, but is not limited to, a first network device 102a and an nth network device 102n (collectively referred to as "network devices 102"). The system 100 may also include a datacenter 104. The system 100 may include multiple datacenters. For example, the system 100 may include almost any number of network devices 102 and/or datacenters 104.

The network devices 102 and the datacenter 104 are communicatively coupled via a network 106. In some example embodiments, the network 106 may be the Internet, an intranet, a private network, or another type of computer network. The network 106 may be a combination of Internet and intranet networks. Additional details regarding the network 106 will be discussed below with respect to FIG. 7.

As will be explained in greater detail below, each network device 102 can connect to the datacenter 104 using a unique connection address. For example, the first network device 102a can connect to the datacenter 104 using a first connection address. In addition, the nth network device 102n can connect to the datacenter 104 using an nth connection address. Each connection address can provide customizable network-level settings. In addition, each connection address can facilitate customizable branding, as will be explained further below.

Figure 2:
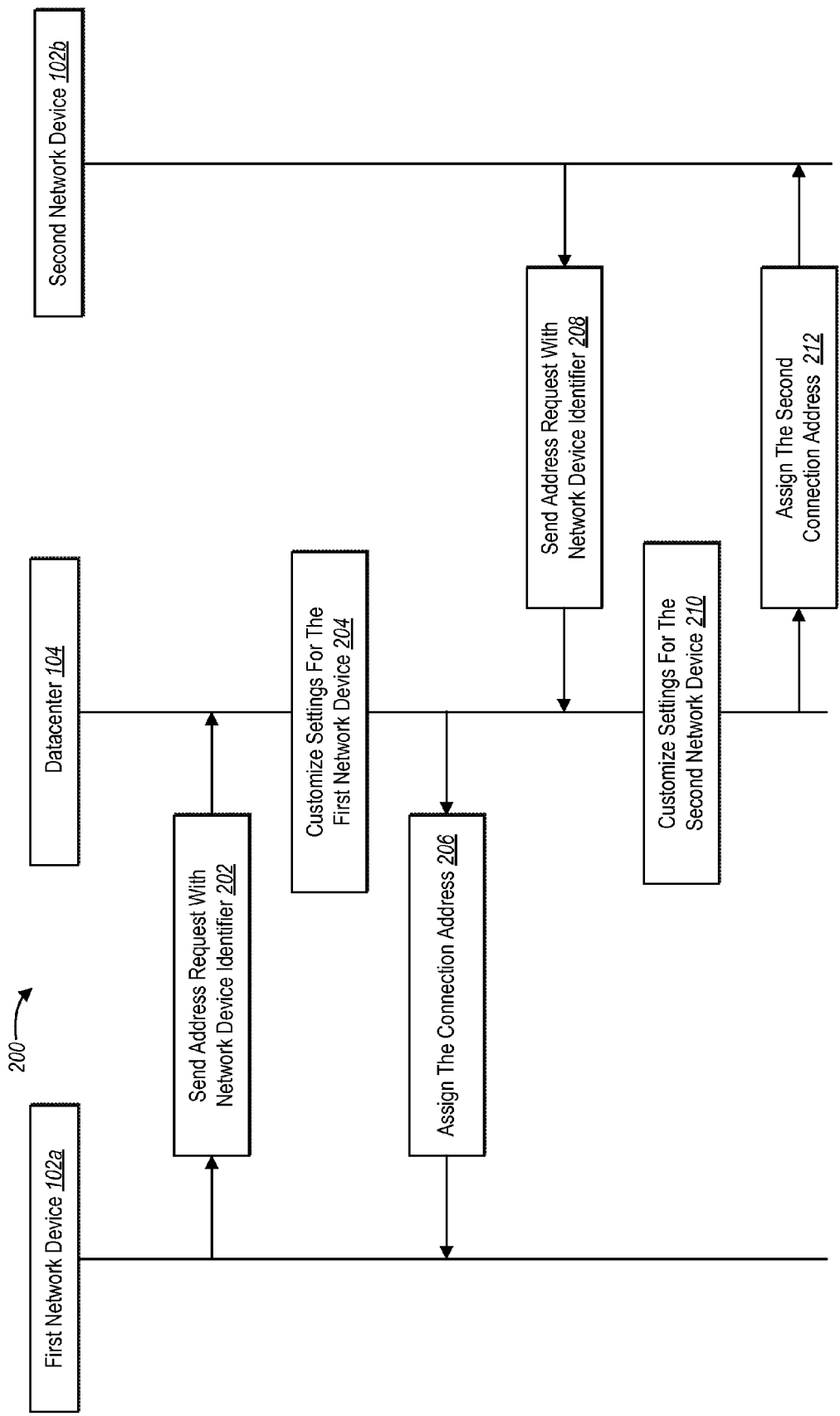
FIG. 2 illustrates a sequence-flow diagram illustrating interactions between multiple network devices and a datacenter in the network-based communication system of FIG. 1 in accordance with one or more embodiments disclosed herein.

FIG. 2 illustrates a sequence-flow diagram 200 illustrating interactions between multiple network devices 102 and a datacenter 104 in the network-based communication system 100 of FIG. 1 in accordance with one or more embodiments disclosed herein. In particular, the sequence-flow 200 of FIG. 2 illustrates an example sequence of a first network device 102a and a second network device 102b each being assigned a connection address.

To illustrate, in step 202 the first network device 202a sends an address request to the datacenter 104. As part of the address request, the first network device 102a may send a network device identifier to the datacenter 104. Additional detail regarding network device identifiers will be described below.

Step 204 may include the datacenter 104 customizing network-level settings for the first network device 102a. For example, the datacenter 104 may obtain information associated with the first network device 102a using the network device identifier, such as the first network device's type, properties, characteristics, etc. The datacenter 104 may customize network-level settings for a connection address based on the obtained information.

In particular, the datacenter 104 may associate the network-level settings prepared for the first network device 102a with a connection address. For example, the datacenter 104 may bind the network-level settings for the first network device 102a to an existing connection address. As another example, the datacenter 104 may associate the network-level settings with a newly created connection address. The process of customizing network-level settings for a network device and associating the network-level settings with a connection address will be described in greater detail below.

Step 206 may include the datacenter 104 assigning the connection address to the first network device 102a. The first network device 102a may receive the connection address and connect to the datacenter 104 using the connection address. The first network device 102a benefits from optimal network-level settings when using the connection address because the network-level settings provided to the first network device 102a, using the connection address, are customized for the first network device 102a.

As an example, the first network device 102a may be a satellite network device. The datacenter 104 may obtain information from the first network device 102a that indicates that the first network device 102a is a satellite network device. For instance, after the datacenter 104 receives the network device identifier from the first network device 102a, the datacenter 104 may use the network device identifier to lookup the first network device's 120a type. The datacenter 104 may customize a set of network-level settings based on the first network device 102a type, prepare a connection address for the first network device 102a, and assign the connection address to the first network device 102a. Customers using the first network device 102a may experience improved communications when the first network device 102a is connected to the datacenter 104 using the connection address.

Step 208 may include the second network device 102b sending an address request to the datacenter 104. As part of the address request, the second network device 102b may send a network device identifier for the second network device 102b to the datacenter 104. In general, the identifier of for second network device 102b is different from the identifier for the first network device 102a. In this manner, the datacenter 104 can distinguish between the first network device 102a and the second network device 102b. In particular, the network device identifier is unique for each network device.

In step 210, the datacenter 104 may customize network-level settings for the second network device 102b. In customizing network-level settings for the second network device 102b, the datacenter 104 may use the same or different network-level settings used for the first network device 102a. For example, the first network device 102a and the second network device 102b may be share the same device type, properties, and characteristics. As such, optimal network-level settings for the first network device 102a match optimal network-level settings for the second network device 102b. However, even though the first network device 102a and the second network device 102b are similar, or perhaps identical, the datacenter 104 may associate the network-level settings prepared for the second network device 102b to a second connection address. Thus, regardless of if the two network devices 102 are the same or different, each network device 102 may connect to the datacenter 104 using its own unique connection address.

As part of the customization process, the datacenter 104 may associate hostnames with each connection address. For example, hostnames may correspond to the system provider or to a white label entity. For instance, the datacenter 104 may associate a first connection address with a first white label entity and a second connection address with a second white label entity. As such, when the first network device 102a connects to the datacenter 104 using the first connection address, the first network device 102a displays the hostname associated with the first white label entity. Similarly, when the second network device 102b connects to the datacenter 104 using the second connection address, the second network device 102b displays the hostname associated with the second white label entity. In this manner, the datacenter 104 can provide network-level settings optimal for each network device 102 as well as tailored branding on each network device 102.

Step 212 may include the datacenter 104 assigning the second connection address to the second network device 102b. The second network device 102b may receive the second connection address and connect to the datacenter 104 using the second connection address. In this manner, the second network device 102b benefits from the network-level settings the datacenter 104 customized for the second network device 102b.

Figure 3:
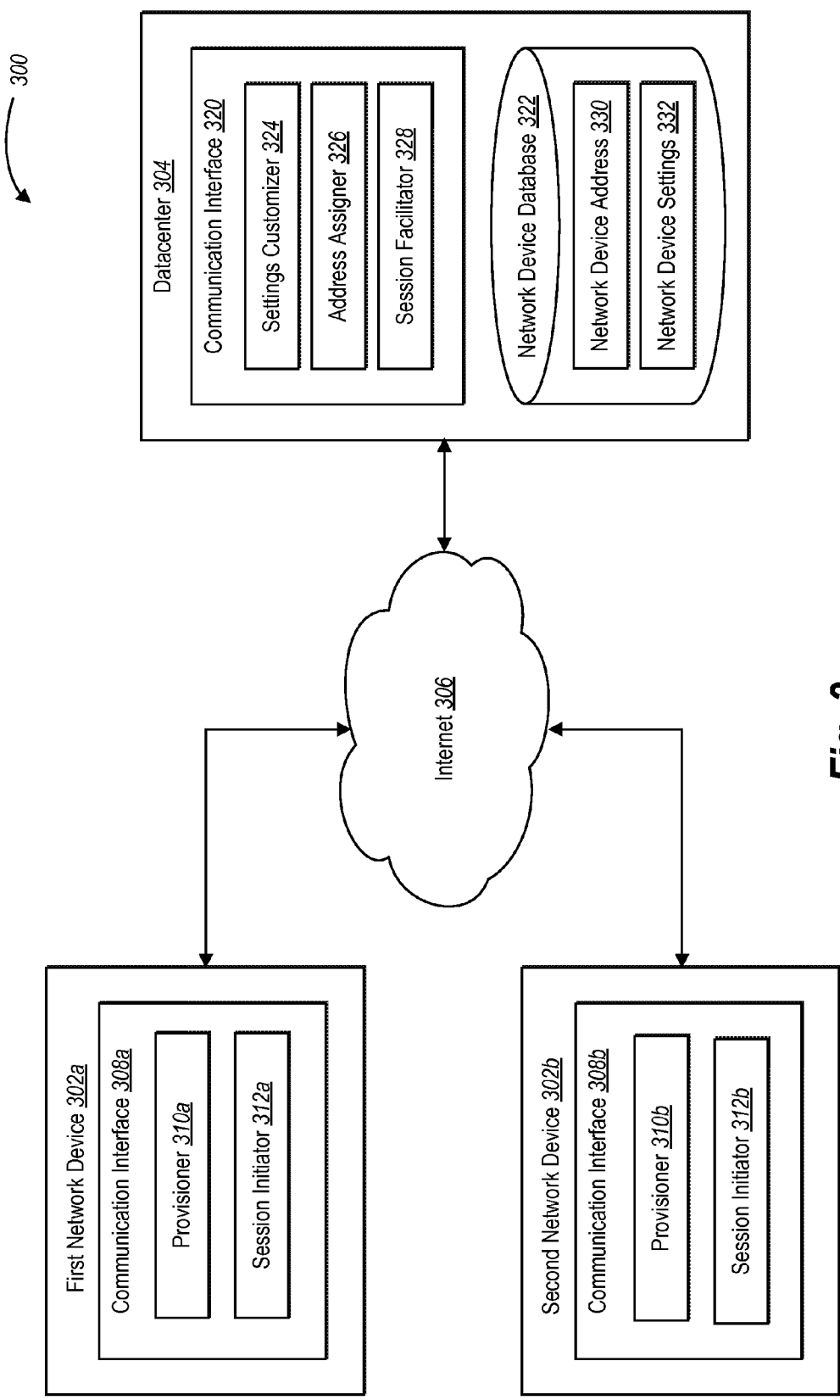
FIG. 3 illustrates a network-based communication system in accordance with one or more embodiments disclosed herein.

FIG. 3 illustrates an exemplary network-based VoIP communication system 300 (hereafter "VoIP system 300") according to principles described herein. As illustrated, the VoIP system 300 includes a first network device 302a, a second network device 302b, and a datacenter 304. For example, the VoIP system 300 may represent one or more embodiments of the network based communication system 100 described in connection with FIG. 1. For instance, the first network device 302a and the second network device 302b may be example embodiments of the network devices 102a-n described in connection with FIG. 1. Likewise, the datacenter 304 may be one example embodiment of the datacenter 104. Although the VoIP system 300 is described as having a first network device 302a and a second network device 302b (collectively "network devices 302") for ease of explanation, the principles described with respect to FIG. 3 can be implemented within a VoIP system 300 having any number of network devices 302 and datacenters 304.

The network devices 302 may connect to the datacenter 304 via the Internet 306. In some example embodiments, one or more network devices 302 may be directly connected the datacenter 304. In addition, one or more network devices 302 may securely connect to the datacenter 304 via a secure connection, for example, using secure sockets layer ("SSL") protocol, or another cryptographic protocol.

The network devices 302 may be similar or different from each other. For example, the first network device 302a and the second network device 302b may both be mobile network devices. In some example embodiments, the network devices 302 may be VoIP devices that allow a user to communicate with other users. For instance, the first network device 302a may facilitate voice and/or data communication sessions between users. In addition, as described above, users may communicate with other users using other forms of communication facilitated by a network device 302, such as a videoconference.

As illustrated, the first network device 302a includes a communication interface 308 having a provisioner 310a and a session initiator 312a. In addition, the first network device 302a may also include input and output audio/video functionality as described below in connection with FIG. 7. For example, as described in greater detail below, the first network device 302a may be a dedicated device, or a soft device, such as a dedicated VoIP device.

For convenience, the network devices will be described with reference to the first network device 302a. The second network device 302b, however, similarly includes a communication interface 308b having a provisioner 310b and a session initiator 312b. Further, the second network device 302b may be described similarly to the first network device 302a described below. For example, the provisioner 310b and the session initiator 312b of the second network device 302b may perform similar operations as the provisioner 310a and a session initiator 312a of the first network device 302a.

Each of the components 310a-312a of VoIP system 300 may be in communication with one another using any suitable communication technologies. It will be recognized that although components 310a-312a are shown to be separate in FIG. 3, any of components 310a-312a may be combined into fewer components, such as into a single component, or divided into more components as may serve a particular embodiment. In addition, components 310a-312a may be located on, or implemented by, one or more network devices, such as those described below in relation to FIG. 7. Alternatively, portions of components 310a-312a can be located on a network device 302, while other portions are located on one or more datacenters 304.

Components 310a-312a can comprise software, hardware, or both. For example, components 310a-312a can comprise one or more instructions stored on a non-transitory computer-readable storage medium and executable by processors of one or more computing devices. When executed by the one or more processors, the computer-executable instructions of VoIP system 300 can cause a network device and/or datacenter to perform the methods described herein. Alternatively, components 310a-312a can comprise hardware, such as a special purpose processing device to perform a certain function or group of functions. Additionally or alternatively, components 310a-312a can comprise a combination of computer-executable instructions and hardware.

The communication interface 308a can send and receive data. For example, the communication interface 308a may send or receive queries, requests, acknowledgements, signals, indications, etc., between the first network device 302a and the datacenter 304. For instance, the communication interface 308a may assist the first network device 302a in connecting to the datacenter 304.

In one example embodiment, the provisioner 310a connects the first network device 302a the datacenter 304. For example, the provisioner 310a may facilitate the connection between the first network device 302a and the datacenter 304. The first network device 302a may communicate with other network devices 302 and/or other electronic devices via the VoIP system 300 once connected with the datacenter 304.

As part of the provisioning process, the provisioner 310a may request a connection address from the datacenter 304 for the first network device 302a. For example, the provisioner 310a may first connect to the datacenter 304 using a default address and may request a connection address from the datacenter 304. For instance, the default address may be the datacenter's IP address, such as www.datacenter.net. In some example, embodiments, the default address may be stored in memory on the first network device 302a. For example, when the first network device 302a powers on or initializes, the provisioner 310a may connect the first network device 302a to the default address stored in memory on the first network device 302a. Once the first network device 302a is connected to the datacenter 304, the provisioner 310a may request a connection address. As described in greater detail below, an address assigner 326 on the datacenter 304 may assign a connection address to the first network device 302a in response to the request for a connection address.

In some example embodiments, the network device 202 may register with multiple datacenters 304. For example, the provisioner 310a can connect the first network device 302a to a first datacenter. In response to the request, for example, the provisioner 310a may receive a connection address from the first datacenter 304. The provisioner 310a may also connect the first network device 302a to a second datacenter 304, while maintaining the connection with the first datacenter 304. For example, the provisioner 310a can receive a second connection address from the second datacenter 304. In this manner, the first network device 302a may communicate with other network devices using the first connection address and/or the second connection address.

The session initiator 312a can facilitate communications between users via the first network device 302a. For example, the session initiator 312a may initiate audio, video, and other types of communication sessions between users. The session initiator 312a may employ protocol, such as SIP, in facilitating communication sessions between users. As described in further detail below, the session initiator 312a may communicate with the session facilitator 328 on a datacenter 304 to which a network device 302 connects.

As illustrated in FIG. 3, the datacenter 304 includes a communication interface 320 and a network device database 322. The communication interface 320 may send or receive queries, assignments, instructions, requests, acknowledgements, signals, indications, etc., between the datacenter 304 and one or more network devices 302. For example, the communication interface 320 can receive a request for a connection address from a network device 302 and provide a connection address to the network device 302 in response.

As illustrated, the communication interface 320 may include a settings customizer 324, an address assigner 326, and a session facilitator 328. Each of the components 324-328 of VoIP system 300 may be in communication with one another using any suitable communication technologies. It will be recognized that although components 324-328 are shown to be separate in FIG. 3, any of components 324-328 may be combined into fewer components, such as into a single component, or divided into more components as may serve a particular embodiment. In addition, components 324-328 may be located on, or implemented by, one or more network devices, such as those described below in relation to FIG. 7. Alternatively, portions of components 324-328 can be located on a network device 302, while other portions are located on one or more network devices 302.

Components 324-328 can comprise software, hardware, or both. For example, components 324-328 can comprise one or more instructions stored on a non-transitory computer-readable storage medium and executable by processors of one or more computing devices. When executed by the one or more processors, the computer-executable instructions of VoIP system 300 can cause a network device and/or datacenter to perform the methods described herein. Alternatively, components 324-328 can comprise hardware, such as a special purpose processing device to perform a certain function or group of functions. Additionally or alternatively, components 324-328 can comprise a combination of computer-executable instructions and hardware.

As described above, a network device 302 can request a connection address from the datacenter 304. The datacenter 304 may employ one or more methods, for example, to assign a connection address to a network device 302. For example, in one or more embodiments, the datacenter 304 may configure network-level settings optimal for the network device 302. In one or more embodiments, the datacenter 304 may provide customize branding to the network device 302. In addition, in one or more embodiments, the datacenter 304 assign both a network device address and a unique connection address to the network device 302. Further, in one or more embodiments, the datacenter 304 may verify that the network device 302 is authorized to connect to the VoIP system 300. Each of these embodiments will be described below in greater detail.

In some example embodiments, the datacenter 304 may configure network-level settings optimal for network devices 302 on a per network device 302 basis. In particular, the settings customizer 324 may customize network-level settings for each network device 302 that connects to the datacenter 304. For example, the settings customizer 324 may customize network-level settings optimized for the first network device 302a. In addition, the settings customizer 324 may customize network-level settings optimized for the second network device 302b. Network-level settings may include signaling protocol settings, such as the amount of time a retry timer runs before expiring, or the number of retry attempts before a network device times out. In particular, network-level settings may correspond to a specific protocol, such as SIP.

In one or more embodiments, the settings customizer 324 may receive information from a network device 302. For example, the first network device 302a may send a network device identifier to the datacenter 304 when requesting a connection address. The network device identifier may be an identification number unique to the network device 302. For example, the network device identifier may be tied to the MAC (media access control) address of the network device 302. Alternatively, the network device identifier may include a phone number assigned to the network device 302.

In one or more embodiments, the settings customizer 324 may use the received information to obtain additional information regarding the network device 302. For example, the settings customizer 324 may use the network device identifier to lookup the type, properties, and characteristics of the network device 302. Furthermore, the settings customizer 324 may look up network device information 320 associated with each network device 302 stored in the network device database 322. FIG. 4A, described below, provides an example table showing how the settings customizer 324 may look up network device information using the network device identifier.

In one or more embodiments, the settings customizer 324 may obtain information about a network device 302 based on the network device identifier. For example, a portion of the network device identifier may indicate the device type of a network device 302. In other words, the network device identifier may be parsed to obtain a portion of the identifier. The portion may then be used to determine the network device type. For example the portion may be compared to a network device type table.

In some embodiments, the settings customizer 324 may use the information received from the address assigner 326 to determine properties and characteristics of the network device 302. For example, the settings customizer 324 may determine the network device type, such as if the network device 302 is a satellite, fixed-line, Wi-Fi, mobile, or other type of network device 302. As another example, the settings customizer 324 may determine if the network device 302 is associated with a personal, residential, small business, home office, or enterprise account. In addition, the settings customizer 324 may determine if the network device 302 requires specific network-level settings based on past performance of the network device 302, and update the network-level settings upon determining that new network-level settings applied to past performance would achieve optimal connection settings.

In one or more embodiments, upon ascertaining additional information about a network device 302, the settings customizer 324 may customize network-level settings for the network device 302. In this manner, the settings customizer 324 may customize network-level settings for each network device 302 that connects to the datacenter 304. Thus, when multiple network devices 302 are connected to the datacenter 304, each network device 302 may be connected using network-level settings customized by the settings customizer 324.

In some example embodiments, the settings customizer 324 may receive network-level settings from a network device 302. For example, the first network device 302a may provide one or more network-level settings to the settings customizer 324. The network-level settings received from the first network device 302a may already be optimized for the first network device 302a. The settings customizer 324 may use one or more of the network-level settings received from the first network device 302a in setting the network-level settings for the first network device 302a.

In addition, in some embodiments, the network device 302 may request that network-level settings be updated. For example, the network device 302 may experience issues and/or faults using the current network-level settings. For instance, the network device 302 may timeout when attempting to make a call. As a result, the network device 302 may report conditions to the settings customizer 324 and/or request that the network-level settings be modified, for example, to provide an increased call timer. In response, the settings customizer 324 may modify the network-level settings based on the network device's 302 request.

In one or more embodiments, the settings customizer 324 may use default network-level settings. For example, if the settings customizer 324 is unable to ascertain information from the network device 302, the settings customizer 324 may customize the network-level settings using default network-level settings. In some embodiments, the default network-level settings may be based on a level of service contracted by a customer associated with a network device 302.

In addition, in some example embodiments, the settings customizer 324 may update the network-level settings for a network device 302. For example, a network device 302 may connect to the datacenter 304 using a connection address having a first set of network-level settings. The settings customizer 324 may subsequently modify the network-level settings for the network device 302. For example, if the datacenter 304 is experiencing an unusually high level of activity, the settings customizer 324 may downgrade the network-level settings for one or more network device 302. Upon modifying the network-level settings, the settings customizer 324 may associate the network-level settings with the connection address. Associating network-level settings with a connection address is discussed below in greater detail.

As addressed above, in one or more embodiments, the datacenter 304 may provide customize branding to the network device 302. In particular, the settings customizer 324 may determine whether a network device 302 is associated with a white label entity. For example, the settings customizer 324 may lookup if the network device 302 is tied to white label entity. For example, the network device 302 is associated with a customer who has contracted with a white label entity for VoIP services.

In some embodiments, the network device identifier may be used to determine if a network device 302 is associated with a white label entity. For instance, the settings customizer 324 may identify network devices 302 having a network device identifier between 100 and 200 as belonging to While Label X. In addition, the settings customizer 324 may look up information, including white label entity association, in the network device database 322. In some instances, the network device 302 may send an indication that the network device 302 is associated with a white label entity.

When the network device 302 is associated with a white label entity, the settings customizer 324 can customize the network-level settings to reflect a hostname associated with the white label entity. In particular, the settings customizer 324 may customize the network-level settings to display the hostname white-label.com. In a similar manner, if the network device 302 is not associated with a white label entity, the settings customizer 324 may customize the network-level settings to indicate to the network device 302 that the network device 302 is associated directly with the system provider. For example, the settings customizer 324 may configure the network-level settings to display the hostname system-provider.net on a network device 302. In this manner, when a network device 302 is associated with a white label entity, the settings customizer 324 may customize the network-level settings to display a hostname on the network device 302 that indicates to a user that the network device 302 is operated by the white label entity rather than by the system provider.

As briefly mentioned above, in one or more embodiments, the datacenter 304 can assign a network device address to the network device 302 when the network device 302 first connects to the datacenter 304. As used herein, the "network device address" is the address where the network device 302 can be reached by other network devices on the VoIP system 300. For example, the address assigner 326 assigns a network device address to the first network device 302a. In some embodiments, the network device address may be stored in the datacenter device database 322.

In one or more embodiments, the address assigner 326 may provide a network device address to the network device 302 that includes the network device's network device identifier. In some instances, the network device address may be in the form of <network device identifier>@domain.net. For example, the address assigner 326 may provide the network device address to the first network device 302a based on the network device identifier of the first network device 302a. For example, the network device address may be the network device identifier of the first network device 302a, followed by an indication of which datacenter is assigning the address, and/or followed by an indication of the system to which the device is connected. For instance, if first the network device 302a had a network device identifier of WA01BC992, the datacenter 304 may give the first network device 302a the address WA01BC992@datacenter.VoIPSystem.net.

In some example embodiments, the network device address assigned to the first network device 302a may correspond to a white label associated with a network device 302. In other words, the address assigner 326 may assign a network device address that includes a hostname of the system provider or of a white label entity. For example, if the network device 302 is associated with White Label Q, the address assigner 326 may assigner a network device address WA01BC992@white-label-Q.biz. Similarly, if the network device 302 is not associated with a white label entity, the address assigner 326 may assign a network device address WA01BC992@system-provider.net.

As addressed previously, in one or more embodiments, the datacenter 304 assigns a unique connection address to the network device 302. In particular, the address assigner 326 may provide a connection address to a network device 302 and register the network device 302 with the VoIP system 300. In some embodiments, as with the network device address, the connection address may be stored in the datacenter device database 322. As such, for each network device 302 that the address assigner 326 assigns a connection address, the address assigner 326 may store the corresponding network device connection address 330 in the network device database 322.

In one or more embodiments, the address assigner 326 may use the network device database 322 in assigning connection addresses. For example, the address assigner 326 may lookup connection addresses in a table to identify one or more available connection addresses. In addition to looking up connection address information, the address assigner 326 may look up in the network device database 322 which connection addresses are in use and which connection addresses are available. Thus, the address assigner 326 may select a connection address to assign to a network device 302 upon receiving a request for a connection address.

In some example embodiments, the address assigner 326 may create a connection address based on a unique network device identifier received from a network device 302. In this manner, the connection address will be unique for the network device 302 because no other network device 302 uses the same network device identifier. Additional detail regarding selecting an available connection address is provided below.

Before assigning the connection address to the network device 302, in some example embodiments, the address assigner 326 may associate network-level settings with the connection address. For example, the address assigner 326 may receive customized network-level settings from the settings customizer 324. As described in detail above, the settings customizer 324 may customize network-level settings for a network device 302 when the network device 302 request to connect to the VoIP system 300.

In associating the customized network-level settings with the connection address, the address assigner 326 may, for instance, bind, map, and/or pair the network-level settings with the connection address. In addition, if the network-level settings provided by the settings customizer 324 specify a hostname, the address assigner 326 may also associate the hostname with the connection address. In this manner, when a network device 302 connects to the datacenter 304 using the connection address, the network device 302 may display the hostname to a user. In this manner, a customer using the network device 302 fully credits the white label entity associated with the displayed for providing the communication services.

In one or more embodiments, the connection address includes multiple address components, such as a shared component and an exclusive component. While the connection address herein is described in terms of a shared component and an exclusive component, one of skill in the art will appreciate that other methods and approaches may be employed to achieve a similar outcome of associating each network device 302 with a unique connection address at the datacenter 304. For example, in some example embodiments, an IP version 6 addresses may be used to provide multiple connection addresses to the datacenter 304.

In one or more example embodiments, the shared component may include a logical address, such as an IP address. The IP address may be associated with the datacenter 304. Thus, for example, in some embodiments, the shared component of the connection address assigned to each network device 302 may be the same, i.e., the IP address of the datacenter 304. While a single IP address for the datacenter 304 is described herein, additional IP addresses may be employed as part of the shared component. In one or more embodiments, the shared component may include a physical address, such as a media access control address, or a virtual address.

In one or more example embodiments, the exclusive component may include a physical address, a logical address, or a virtual address. As used herein, the term "logical address" generally refers to a label that identifies an electronic device, such as a datacenter 304. As described above, the logical address may be an Internet Protocol ("IP") address. In particular, the logical address may be the IP address of a datacenter 304. In general, a logical address is separate from a physical address of a network device 302, such as a media access control (MAC) address associated with a network device 302. Also of note, the IP address may be linked to hostnames (e.g., domain names). One of skill in the art would appreciate the relationship between hostnames and IP address, as described herein.

As used herein, the term "virtual address" generally refers to an application-specific or process-specific software construct serving as a communications endpoint. For example, a virtual address may refer to a port (e.g., virtual port) associated with the IP address of a datacenter 304. The port may be identified using a port number. Port numbers generally range from 0 to 65535, but may include other identifies in some example embodiments. Thus, multiple port numbers can be bound to a single IP address.

In one or more embodiments, the virtual component may be a virtual port number associated with the IP address of the datacenter 304. For instance, each network device 302 connected to the datacenter 304 may be connected using a distinct port number. As such, each connection address assigned by the address assigner 326 includes the IP address of the datacenter 304 as the shared component and a distinct port number as the exclusive component. In one or more embodiments, the exclusive component may include a physical address or a logical address. A specific example of the shared component and the exclusive component is provided below in connection with FIGS. 4A and 4B.

As an example of a connection address including a shared component and an exclusive component, the first network device 302*a* may send a request to establish a connection to the datacenter 304. In response, the address assigner 326 may assign the first network device 302*a* the connection address www.datacenter.com:12345, where www.datacenter.com is the shared portion of the connection address and 12345 is the exclusive portion of the connection address. Once connected to the datacenter 304 using the connection address, further communications sent to the datacenter 304 are routed to the specific process bound to the destination port number. For example, future communications from the first network device 302*a* may be routed to the datacenter resource that is served by port 12345 of the datacenter 304.

As discussed above, when a network device 302 first connects to the datacenter 304, the network device 302 may use a default connection address. For example, the default connection address may include only the shared component on a connection address, such as an IP address or default hostname of the datacenter 304. Alternatively, in some instances, the exclusive component of the default connection address may initially be set to a non-unique address. For example, the exclusive component may specify the port number 80. In this case, the network device 302 can use the default connection address www.datacenter.net:80, for example, when first connecting to the datacenter 304 to request a network device address and/or a connection address. In this instance, when the datacenter 304 receives a request on the default connection address, the datacenter 304 may recognize that a new network device 302 is requesting to connect to the VoIP system 300.

As addressed above, in one or more embodiments, the datacenter 304 may verify that the network device 302 is authorized to connect to the VoIP system 300. In particular, before the address assigner 326 assigns a device network device address and/or a connection address to the network device 302, the address assigner 326 may verify that the first network device 302*a* is authorized to connect to the VoIP system 300. For example, the address assigner 326 may verify the validity of a security certificate associated with the network device 302. The security certificate may be stored on first network device 302*a* and/or on the datacenter 304, for example.

In some example embodiments, a security certificate may be created when a customer purchases VoIP services. For example, a security certificate may be created when a customers begins or renews service. For instance, security certificates may expire on a regular bases, such as every 6 months. When a customer renews their service, a new security certificate may be created. Alternatively, the security certificate may be renewed or re-created as long as the customer has paid for the services.

In some embodiments, if a customer fails to pay for contracted services, for instance, to the system provider, the system provider may invalidate the security certificate or let the security certificate expire. In this case, when the customer attempts to connect to the VoIP system 300, the address assigner 326 will deny access by preventing the network device 302 from receiving a network device address or a connection address. In addition, the address assigner 326 can disable the connection address that the network device 302 uses to connect to the datacenter 304. Further, the settings customizer 324 may reduce the network-level settings associated with the connection address to prevent the network device 302 from using services provided by the datacenter 304.

In some embodiments, a security certificate may be associated with a white label entity. For example, the security certificate may be between the white label entity and a customer, in a similar manner as described above. Additionally, and/or alternatively, the address assigner 326 may verify the validity of a security certificate between the white label and the system provider. In this manner, the system provider may verify that the white label is also authorized to access the VoIP system 300 before granting access to customers of the white label entity.

The session facilitator 328 may facilitate a communication session between the two users. For instance, the session facilitator 328 may establish a media bridge connection between the network devices 302 of the two users. As described above, the session facilitator 328 may provide communication services to a session initiator 312 on a network device 302.

In particular, the session facilitator 328 may provide communication services to connected network devices 302. For example, the first user associated with the first network device 302a may request to participate in a communication session with a second user associated with the second network device 302b. The first network device 302a associated with the first user may request that the session facilitator 328 provide a media bridge connection between the first network device 302a and the second network device 302b. The session facilitator 328 may first look up the network device address of the second network device 302b, for example, by looking up the network device address of the second network device 302b in the device database 322. The session facilitator 328 may then provide a media bridge connection path between the first network device 302a and the second network device 302b.

In one or more embodiments, groups of network devices 302 may be assigned a connection address. Network devices 302 may be grouped according to one or more factors, such as network device type, white label entity associations, hostname associates, connection type, connection characteristics, etc. For example, both the first network device 302a and the second network device 302b may be assigned the same connection address because both network devices 302 are satellite network devices. Accordingly, the optimal network-level settings may be the same for both the first network device 302a and the second network device 302b. As another example, the first network device 302a and the second network device 302b may be different network device types, but both may be associated with the same white label entity. In this example, other network devices 302 associated with the white label entity may be assigned the same connection address as the first network device 302a and the second network device 302b.

Figure 4B:

FIGS. 4A-4B illustrate example Tables 400A and 400B used by a datacenter 304 in the VoIP communication system 300 of FIG. 3 in accordance with one or more embodiments disclosed herein. For example, Tables 400A and 400B may be stored in the network device database 322. In particular, Tables 400A and 400B illustrate possible associations between one or more network devices 302, shared address components, exclusive address components, white label entities, and/or network-level settings. Network-level settings can include hostname, timers, and counters. The datacenter 304 can use associations in assigning a connection address to a network device 302, customizing network-level settings, and/or storing network device information. For example, the address assigner 326 and the settings customizer 324 may store and look up information illustrated in table 400a and/or table 400b. For convenience, Tables 400A and 400B use the variables p, n, x, t, k, and i, which signify non-negative integers.

As illustrated in FIG. 4A, Tables 400A includes a device identifier 402, shared address 404, exclusive address 406, hostname 408, retry timer 410, retry count 412, and certificate identification 414. In some embodiments, the network device identifier 402 represents each network device 302 connected to the datacenter 304. In other embodiments, the network device identifier 402 represents every network device 302 associated with the VoIP system 300 regardless of if the network device 302 is currently connected to the datacenter 304.

As an example, the first network device 302a may request a network device address and/or a connection address from the datacenter 304. The datacenter 304 may use the network device identifier 402 received from the first network device 302a to lookup the shared address 404 and the exclusive address 406. For example, the settings customizer 324 may customize network-level settings for a 4th network device to have a retry timer 410 of 2.0 seconds, a retry counter 412 of 2, and certificate identifier 414 of 1.

In some embodiments, the datacenter 304 can lookup whether a network device 302 is authorized based on the certificate identifier ("cert. ID") associated with the network device 302. For example, a cert. ID of 1-3 may indicate a network device 302 associated with a authorized account. A cert. ID of 4 may indicate a network device 302 associated with an unauthorized or blocked account. The Cert. ID values presented herein are merely illustrative and one will appreciated that other values and association can be made. For example, the cert. ID may be a Boolean value that indicates whether a network device 302 associated with a valid security certificate.

In some embodiments, the datacenter 304 may use the network device identifier 402 received from the first network device 302a to lookup network-level settings, such as the hostname 408, retry timer 410, retry count 412, and/or certificate identifier 414. While the hostname 408, retry timer 410, retry count 412, and/or certificate identifier 414 are illustrated in table 400a, other network-level settings may also be stored, such as signaling protocols, additional timers and counters, previously used network-level settings, default network-level settings, etc. For example, one or more additional times may include a SIP transaction timer.

As another example, the session facilitator 328 can lookup the hostname 408 for network device 3, and the address assigner 326 can associate the hostname 408 white-label.com with the connection address provided to network device 3. As illustrated, multiple network devices 302 may be associated with the same hostname 408. For example, network devices 2, 3, and 4 may each be associated with the same white label entity.

In some embodiments, the datacenter 304 stores the shared address 404 and the exclusive address 406 assigned a network device 302. For example, the address assigner 326 assigns the 3rd network device the exclusive address of 300, such as port number 300. The address assigner 326 then stores the connection address in the network device database 322, for example as a network device address 330.

As shown in Table 400A, each network device 302 may be assigned a connection address having the same shared component. At the same time, however, the connection address assigned to each network device 302 may have a different exclusive component, for example, an exclusive port number. Accordingly, each network device 302 may have a connection address that has the same shared component 404 while each having a distinct exclusive component 406.

As illustrated in FIG. 4B, Table 400B includes a port number 420, a network device identifier 422, a hostname 424, a white label entity 426, network-level settings, such as retry timer 428 and retry count 430, and a certificate identifier 432. In one or more embodiments, the port number 420 may correspond to a group network devices 302. For example, a first group of network devices 302 may be assigned to port number 1000. In addition, a second group of other network devices 302 may be assigned to port number 2000. For instance, all network devices 302 in the second group may share similar characteristics and properties. In some instance, a port may have only one network device 302 assigned, as illustrated with port 3000. Further, a port number 420 may have no network devices 302 assigned to it, as illustrated with port number 4000.

In some embodiments, the port number 420 may correspond to a hostname 424 and/or a white label entity 426. For example, each network device 302 associated with White Label 1 may be assigned port number 2000 as part of the network device's connection address. For the connection address assigned to network devices associated with White Label 1 may include the hostname 424 white-label1.com. As another example, each network device 302 not associated with any white label may be assigned port number 1000 as part of the network device's connection address, as well as provided with the hostname 424 system-provider.net.

In a similar manner, in some embodiments, one or more network-level settings may be associated with a port number 420. For example, each network device 302 connected to the datacenter 304 using port number 2000 may have a retry timer 428 of 1.5 seconds and a retry count 430 of 2. Accordingly, the setting customizer 324 may customize network-level settings for a connection address using information stored in table 400b. For example, table 400b may be associated with the network device settings 332 found in the network device database 322.

Figure 5:
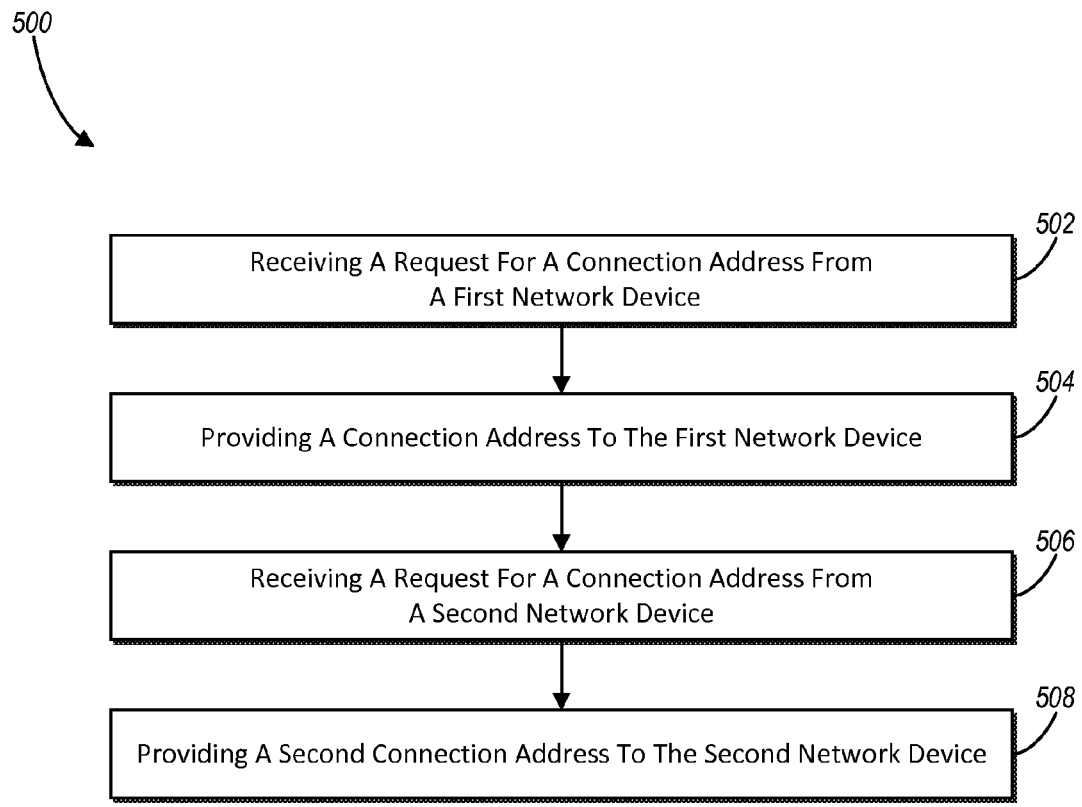
FIG. 5 illustrates a method of assigning one or more unique connection addresses in accordance with one or more embodiments disclosed herein.
Figure 6:
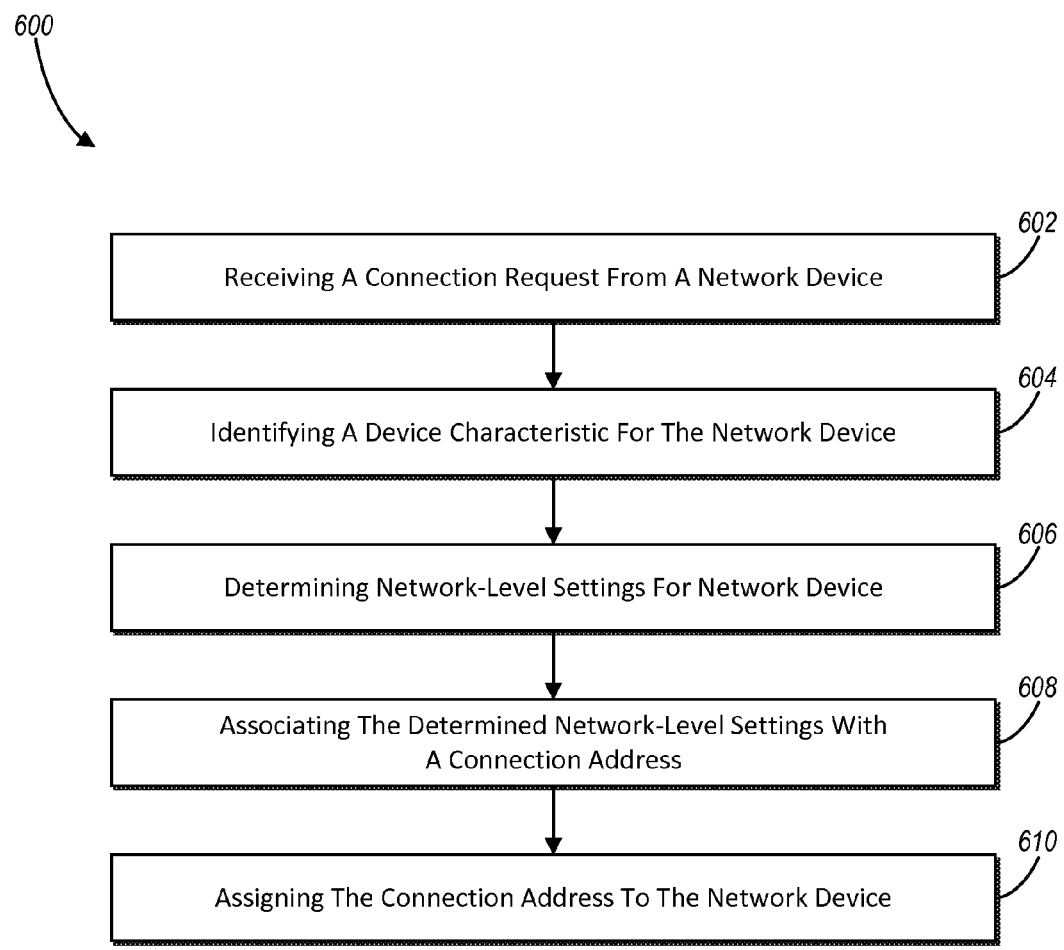
FIG. 6 illustrates a method of customizing a connection address to a network device in accordance with one or more embodiments disclosed herein.

FIGS. 1-4, the corresponding text, and the examples, provide a number of different systems and devices for providing a network based communication system. In addition to the foregoing, embodiments also can be described in terms of flowcharts comprising acts and steps in a method for accomplishing a particular result. For example, FIGS. 5-6 illustrate flowcharts of example methods in accordance with one or more embodiments. The methods described in relation to FIGS. 5-6 may be performed with less or more steps/acts or the steps/acts may be performed in differing orders. Additionally, the steps/acts described herein may be repeated or performed in parallel with one another or in parallel with different instances of the same or similar steps/acts. One or more of the steps shown in FIGS. 5-6 may be performed by any component or combination of components of system 200.

FIG. 5 illustrates a flowchart of one exemplary method 500 of assigning one or more unique connection addresses on a network-based communication system, such as a VoIP system 300. Step 502 may include receiving a request for a connection address from a first network device 302a. In particular, step 502 may include receiving a first request for a connection address where the first request is includes a first identifier associated with a first network device 302a. For example, the datacenter 304 may receive a request for a connection address from the first network device 302a that includes an identifier of the first network device 302a. The address assigner 326 may receive the request in any suitable manner, such as described herein.

Step 504 may include providing a connection address to the first network device 302a. In particular, step 504 may include providing a first connection address to the first network device 302a where the first connection address includes a shared component and a first exclusive component. For example, the address assigner 326 may provide a connection address to the first network device 302a in any suitable manner, such as described herein. To illustrate, the address assigned to the first network device 302a may include a shared component, such as an IP address, and an exclusive component, such as a port number.

Step 506 may include receiving a request for a connection address from a second network device 302b. In particular, step 506 may include receiving a second request for a connection address where the second request includes a second identifier associated with a second network device 302b. For example, the datacenter 304 may received a request for a connection address from the second network device 302b that includes an identifier of the second network device 302b. For instance, the address assigner 326 may receive the request in any suitable manner, such as described herein.

Step 508 may include providing a second connection address to the second network device 302b. In particular, step 508 may include providing a second connection address to the second network device 302b, where the second connection address includes the shared component and a second exclusive address component. For example, the address assigner 326 may provide a connection address to the second network device 302b in any suitable manner, such as described herein. For instance, the connection address provided to the second network device 302b may differ from the connection address provided to the first network device 302a.

FIG. 6 illustrates a method 600 of customizing a connection address to a network device according to the principles described herein. Step 602 may include receiving a connection request from a network device, such as the first network device 302a. In particular, step 602 may include receiving a connection request from a first voice over Internet Protocol device. For example, the datacenter 304 may receive a request for a connection address from the first network device 302a. The address assigner 326 may receive the request in any suitable manner, such as described herein. As described above, in one or more embodiments, the first network device 302a may be a VoIP device.

Step 604 may include identifying a device characteristic for the network device, such as the first network device 302a. In particular, step 604 may include identifying a first device characteristic for the first voice over Internet Protocol device. For example, the datacenter 304 may identify the network device type, characteristics, and properties of the first network device 302a as in any suitable manner, such as described herein. For instance, the settings customizer 324 can lookup information associated with the first network device 302a in the network device database 322.

Step 606 may include determining network-level settings for the network device, such as the first network device 302a. In particular, step 606 may include determining network-level settings for the first voice over Internet Protocol device based on the first device characteristic. For example, the datacenter 304 may determine network-level settings for the first network device 302a. For instance, the settings customizer 324 can determine optimal network-level settings for the first network device 302a as in any suitable manner, such as described herein.

Step 608 may include associating the determined network-level settings with a connection address. In particular, step 608 may include associating the determined network-level settings for the first voice over Internet Protocol device with a first address comprising a shared component and a first exclusive component. For example, the address assigner 326 and/or the settings customizer 324 may associate the customized network-level settings with a connection address as in any suitable manner, such as described herein.

Step 610 may include assigning the connection address to the network device, such as the first network device 302a. In particular, step 610 includes assigning the first connection address to the first voice over Internet Protocol device. For example, the address assigner 326 may assign a connection address to the first network device 302a in any suitable manner, such as described herein.

Figure 7:
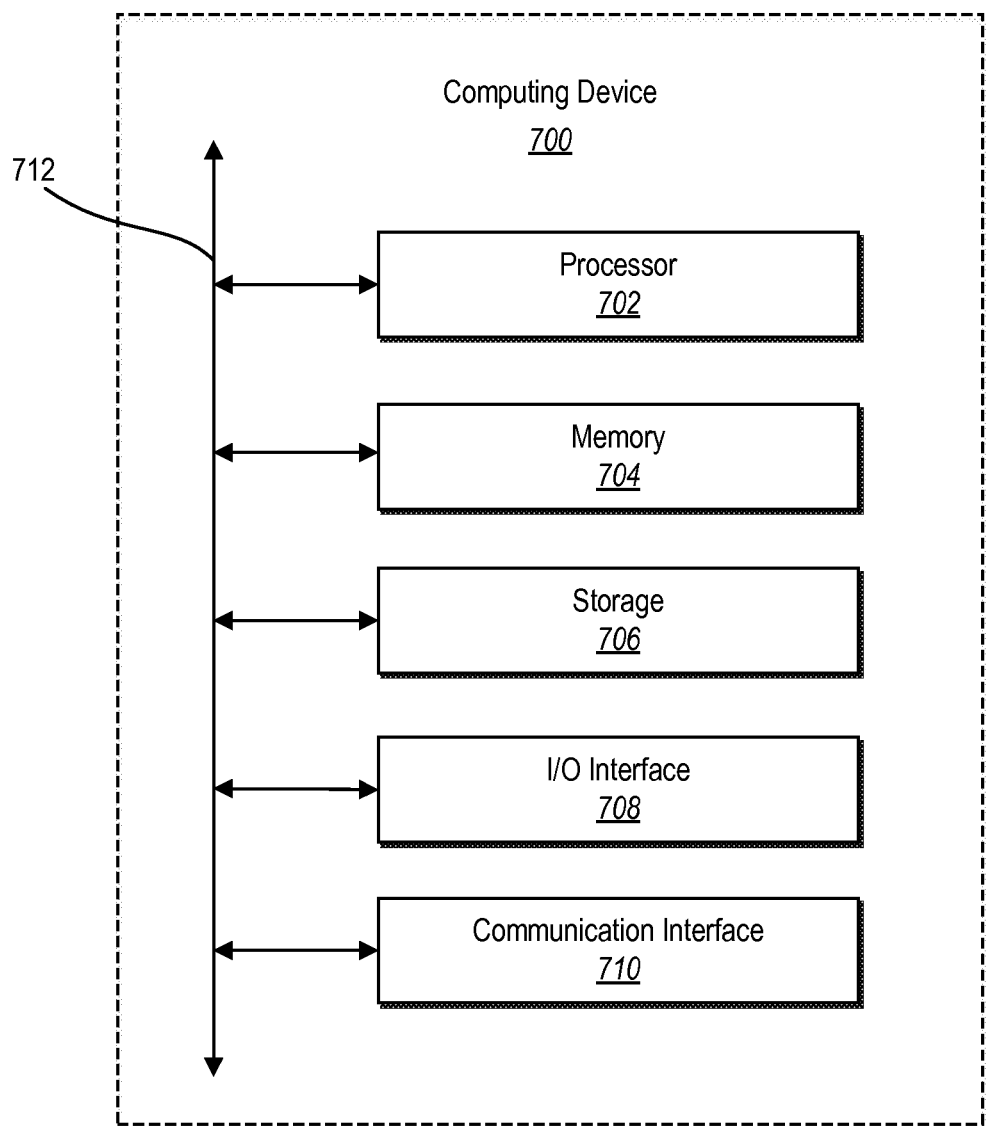
FIG. 7 illustrates a block diagram of a computing device according to the principles described herein.

FIG. 7 illustrates, in block diagram form, an exemplary computing device 700 that may perform one or more of the processes described above. One will appreciate that system 100, and/or VoIP system 200 each comprises one or more computing devices in accordance with implementations of computing device 700. As shown by FIG. 7, the computing device can comprise a processor 702, a memory 704, a storage device 706, an I/O interface 708, and a communication interface 710, which may be communicatively coupled by way of communication infrastructure 712. While an exemplary computing device 700 is shown in FIG. 7, the components illustrated in FIG. 7 are not intended to be limiting. Additional or alternative components may be used in other embodiments. Furthermore, in certain embodiments, a computing device 700 can include fewer components than those shown in FIG. 7. Components of computing device 700 shown in FIG. 7 will now be described in additional detail.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage device 706 and decode and execute them. In particular embodiments, processor 702 may include one or more internal caches for data, instructions, or addresses. As an example and not by way of limitation, processor 702 may include one or more instruction caches, one or more data caches, and one or more translation lookaside buffers ("TLBs"). Instructions in the instruction caches may be copies of instructions in memory 704 or storage 706.

Memory 704 may be used for storing data, metadata, and programs for execution by the processor(s). Memory 704 may include one or more of volatile and non-volatile memories, such as random access memory ("RAM"), read only memory ("ROM"), a solid-state disk ("SSD"), flash, phase change memory ("PCM"), or other types of data storage. Memory 704 may be internal or distributed memory.

Storage device 706 includes storage for storing data or instructions. As an example and not by way of limitation, storage device 706 can comprise a non-transitory storage medium described above. Storage device 706 may include a hard disk drive ("HDD"), a floppy disk drive, flash memory, an optical disc, a magneto-optical disc, magnetic tape, or a universal serial bus ("USB") drive or a combination of two or more of these. Storage device 706 may include removable or non-removable (or fixed) media, where appropriate. Storage device 706 may be internal or external to the computing device 700. In particular embodiments, storage device 706 is non-volatile, solid-state memory. In other embodiments, Storage device 706 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

I/O interface 708 allows a user to provide input to, receive output from, and otherwise transfer data to and receive data from computing device 700. I/O interface 708 may include a mouse, a keypad or a keyboard, a touch screen, a camera, an optical scanner, network interface, modem, other known I/O devices or a combination of such I/O interfaces. I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 708 provides graphical data to a display for presentation to a user. The graphical data may be representative of one or more graphical user interfaces and/or any other graphical content as may serve a particular implementation.

Communication interface 710 can include hardware, software, or both. In any event, communication interface 710 can provide one or more interfaces for communication (such as, for example, packet-based communication) between computing device 700 and one or more other computing devices or networks. As an example and not by way of limitation, communication interface 710 may include a network interface controller ("NIC") or network adapter for communicating with an Ethernet or other wire-based network or a wireless NIC ("WNIC") or wireless adapter for communicating with a wireless network, such as WI-FI.

Additionally or alternatively, communication interface 710 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, communication interface 710 may facilitate communications with a wireless PAN ("WPAN") (such as, for example, a BLUETOOTH WPAN), a WI-FI network, a WI-MAX network, a cellular telephone network (such as, for example, a global system for mobile communications ("GSM") network), a satellite network, a navigation network, a broadband network, a narrowband network, the Internet, a local area network, or any other networks capable of carrying data and/or communication signals between one or more network devices 102 and a datacenter 104.

To illustrate, the communication interface may communicate using any communication platforms and technologies suitable for transporting data and/or communication signals, including known communication technologies, devices, media, and protocols supportive of remote data communications, examples of which include, but are not limited to, data transmission media, communication devices, transmission control protocol ("TCP"), Internet Protocol ("IP"), file transfer protocol ("FTP"), telnet, hypertext transfer protocol ("HTTP"), hypertext transfer protocol secure ("HTTPS"), session initiation protocol ("SIP"), simple object access protocol ("SOAP"), extensible mark-up language ("XML") and variations thereof, simple mail transfer protocol ("SMTP"), real-time transport protocol ("RTP"), user datagram protocol ("UDP"), global system for mobile communications ("GSM") technologies, enhanced data rates for GSM evolution ("EDGE") technologies, code division multiple access ("CDMA") technologies, time division multiple access ("TDMA") technologies, short message service ("SMS"), multimedia message service ("MMS"), radio frequency ("RF") signaling technologies, wireless communication technologies, in-band and out-of-band signaling technologies, and other suitable communication networks and technologies.

Figure 8:
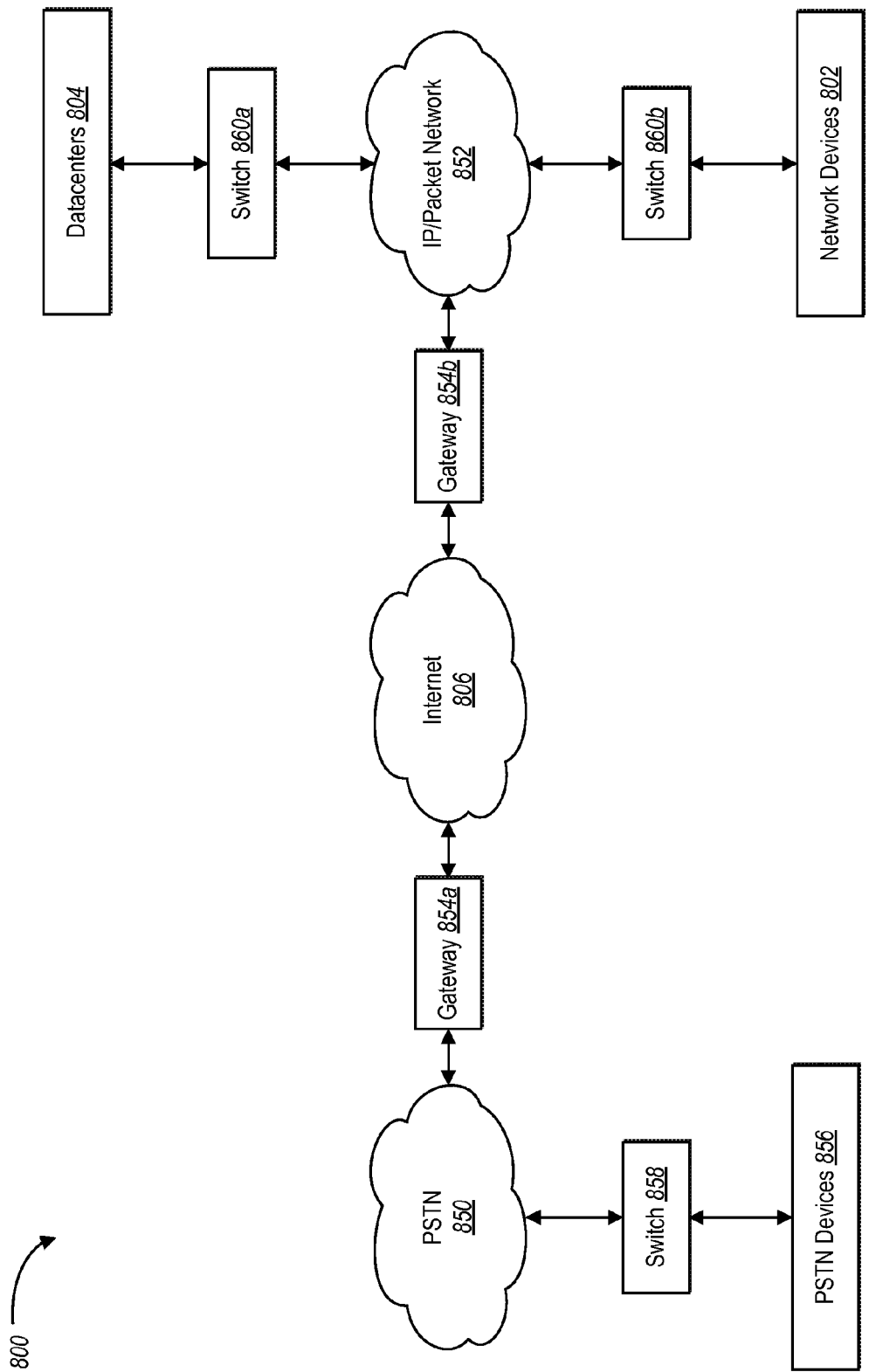
FIG. 8 illustrates an example network environment of a VoIP communication system according to the principles described herein.

Communication infrastructure 712 may include hardware, software, or both that couples components of computing device 700 to each other. As an example and not by way of limitation, communication infrastructure 712 may include an accelerated graphics port ("AGP") or other graphics bus, an enhanced industry standard architecture ("EISA") bus, a front-side bus ("FSB"), a hypertransport ("HT") interconnect, an industry standard architecture ("ISA") bus, an infiniband interconnect, a low-pin-count ("LPC") bus, a memory bus, a micro channel architecture ("MCA") bus, a peripheral component interconnect ("PCI") bus, a PCI-Express ("PCIe") bus, a serial advanced technology attachment ("SATA") bus, a video electronics standards association local ("VLB") bus, or another suitable bus or a combination thereof FIG. 8 illustrates an example network environment of a telecommunication system 800 according to the principles described herein. In particular, the telecommunication system 800 may facilitate both network-based communication systems as well as circuited-switched traditional communication systems. For example, the telecommunication system 800 may allow a user calling from a traditional landline to converse with a user using a VoIP device. In addition, while FIG. 8 illustrates exemplary components and devices according to one embodiment, other embodiments may omit, add to, reorder, and/or modify any of the components and devices shown in FIG. 8.

The telecommunication system 800 may include a PTSN 850 and an IP/packet network 850. The PTSN 850 and the IP/packet network 852 may be connected via a network, such as the Internet 806 or a private network. In some example embodiments, the PTSN 850 and/or the IP/packet network 852 may be connected to the Internet 806 via gateways 854*a-b*. For example, gateway 854*b* may be a signaling gateway and/or a media gateway. For instance, the signaling gateway processes and translates bidirectional SIP signals, and the media gateway handles real-time transport protocol communications. In addition, network trunks may interconnect the PTSN 850, the Internet 806, and the IP/packet network 850.

The PSTN 850 may connect to one or more PSTN devices 856. For example, a switch 858 may connect the one or more PSTN devices 856 to the PSTN 850. PSTN devices 856 may include a variety of devices ranging from traditional landline devices to mobile/cellular devices.

The PSTN 850 may include, but is not limited to telephone lines, fiber optic cables, microwave transmission links, cellular networks, communication satellites, and undersea telephone cables. Switching centers may interconnect each of this components and networks. Further, the PSTN 850 may be analog or digital. In addition, the PSTN 850 may use protocols such as common channel signaling system 7 ("CCS7"). CCS7 is a set of protocols used in the PSTN 850 to setup and tear down communications between subscribers (i.e., users).

As illustrated in FIG. 8, the telecommunication system 800 may include an IP/packet network 852. The IP/packet network 852 may be part of a network-based system, such as a VoIP communication system. VoIP systems are generally known for transmitting voice packets between users. However, VoIP systems also handle other forms of communication, such as video, audio, photographs, multimedia, data, etc. For example, VoIP systems provide communication services for telephone calls, faxes, text messages, and voice-messages.

The IP/packet network 852 provides communication services between users over the Internet 806 rather than using a traditional PSTN 850. However, VoIP systems also allow users to communicate with users using PSTN 850. Thus, a subscriber using a network device 802 may communicate with a subscriber using a PSTN device 856. Furthermore, VoIP systems allow users to communicate with each other without accessing the PSTN 850.

Embodiments disclosed herein may comprise or utilize a special purpose or general-purpose computer including computer hardware, such as, for example, one or more processors and system memory, as discussed in greater detail below. Embodiments within the scope disclosed herein also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the present disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communication connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some example embodiments, computer-executable instructions are executed on a general-purpose computer to turn the general-purpose computer into a special purpose computer implementing elements of the present disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system embodiments, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The present disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As illustrated in FIG. 8, the IP/packet network 852 may also include network devices 802 devices and datacenters 804. The network devices 802 devices and datacenters 804 illustrated in FIG. 8 may be example embodiments of the network device 202 and datacenters 304 described above. For example, example of network devices 802 include a variety of devices, such as personal computers, a tablet computer, handheld devices, mobile phones, smartphones, a personal digital assistants ("PDA"), in- or out-of-car navigation systems, and other electronic access devices. In addition, the network device 802 may be part of an enterprise environment, such as a professional business exchange ("PBX"), a small office/home office environment, or a home/personal environment.

As briefly described above, network devices 802 may include dedicated devices and soft devices. Dedicated devices are commonly designed and appear like a digital business telephone. Soft devices or softphones refer to software installed on a computing device. This software utilizes microphone, audio, and/or video capabilities of the computing device and provides traditional calling functionality to a user, operated via a user interface.

Datacenter 804 may facilitate communications between network devices 802. For example, datacenter 804 registers devices, stores device identification and address information, tracks current communications, and logs past communications, etc., as described above. In addition, datacenters 804 also assists network devices in provisioning, signaling, and establishing user communications via a media bridge.

In the case of multiple datacenters 804, one datacenter 804 may communicate with another datacenter 804. For example, one datacenter 804 may send gathered network device 802 information to the other datacenter 804. In particular, when a datacenter 804 registers a network device 802, that datacenter 804 may send the address information to the other datacenters 804 located on the IP/packet network 852. Accordingly, each datacenter 804 may communicate with others datacenters 804 and assist the IP/packet network 852 in balancing network and processing loads. Further, the datacenters 804 may assist the IP/packet network 852 to ensure that communication sessions between network devices 802 do not fail by communicating with each other.

As illustrated, the network devices 802 and the datacenters 804 may be connected to the IP/packet network 852 via switches 860*a-b*. Switches 860*a-b* manage the flow of data across the IP/packet network 852 by transmitting a received message to the device for which the message was intended. In some example embodiments, the switches 860*a-b* may also perform router functions. Further, while not illustrated, one or more modems may be in electronic communication with the switches 860*a-b*.

In addition, the IP/packet network 852 may facilitate session control and signaling protocols to control the signaling, set-up, and teardown of communication sessions. In particular, the IP/packet network 852 may employ SIP signaling. For example, the IP/packet network 852 may include a SIP server that processes and directs signaling between the network devices 802 and the IP/packet network 852. Other protocols may also be employed. For example, the IP/packet network 852 may adhere to protocols found in the H.225, H.323, and/or H.245 standards, as published by the International Telecommunications Union, available at the following URL—http://www.itu.int/publications.

In particular, session initiation protocol ("SIP") is a standard proposed by the Internet Engineering Task Force ("EITF") for establishing, modifying, and terminating multimedia IP sessions. Specifically, SIP is a client/server protocol in which clients issue requests and servers answer with responses. Currently, SIP defines requests or methods, including INVITE, ACK, OPTIONS, REGISTER, CANCEL, and BYE.

The INVITE request is used to ask for the presence of a contacted party in a multimedia session. The ACK method is sent to acknowledge a new connection. The OPTIONS request is used to get information about the capabilities of the server. In response to an OPTIONS request, the server returns the methods that it supports. The REGISTER method informs a server about the current location of the user. The CANCEL method terminates parallel searches. The client sends a BYE method to leave a session. For example, for a communication session between two network devices 802, the BYE method terminates the communication session.

Once signaling is established, the IP/packet network 852 may establish a media bridge, defined above. In addition, the media bridge caries the payload data for a communication session. The media bridge is separate for the device signaling. For example, in a videoconference, the media bride includes media, such as audio and video data for a communication session.

As described above a datacenter 804 may facilitate a media bridge connection path for a network device 802. For example, when one network device 802 attempts the contact a second network device 802, the datacenter 804 may execute the signaling and also determine a media bridge between the two network devices 802. Further, the datacenter 804 may provide alternate media bridge paths to the network devices 802 in the event that the primary media bridge weakens, for example, below a threshold level, or even fails.

In the foregoing specification, the present disclosure has been described with reference to specific exemplary embodiments thereof. Various embodiments and aspects of the present disclosure are described with reference to details discussed herein, and the accompanying drawings illustrate the various embodiments. The description above and drawings are illustrative of the present disclosure and are not to be construed as limiting the present disclosure. Numerous specific details are described to provide a thorough understanding of various embodiments disclosed herein.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present disclosure is, therefore, indicated by the appended claims rather than by the foregoing description. All changes that come within the meaning and range of equivalency of the claims are to be embraced within their scope.

What is claimed is:

1. A method, comprising:
    receiving, at a datacenter, a first request for a connection address, the first request comprising a first device identifier associated with a first network device, wherein the first device identifier identifies the first network device from among other network devices within a network device database;
    looking up the first device identifier in the network device database to identify a first characteristic of the first network device associated with the first device identifier in the network device database;
    determining network-level settings optimized for the first network device based on the first characteristic of the first network device;
    determining, based on the network-level settings optimized for the first network device, a first connection address that comprises a shared component and a first exclusive component;
    sending the first connection address to the first network device;
    establishing, at the datacenter, a first connection with the first network device via the first connection address using the optimized network-level settings;
    receiving a second request for a connection address, the second request comprising a second device identifier associated with a second network device, wherein the second device identifier identifies the second network device from among the other network devices within the network device database;
    looking up the second device identifier in the network device database to identify a second characteristic of the second network device associated with the second device identifier in the network device database;
    determining that the second characteristic of the second network device is associated with the first characteristic of the first network device;
    sending, based on the identified second characteristic of the second network device being associated with the first characteristic of the first network device, the first connection address to the second network device; and
    establishing, at the datacenter, a second connection with the second network device via the first connection address using the optimized network-level settings.

2. The method of claim 1, wherein the shared component is an IP address of the datacenter.

3. The method of claim 1, wherein the first exclusive component is a first port number assigned by the datacenter.

4. The method of claim 1, wherein the first device identifier comprises a media access control address of the first network device.

5. The method of claim 1, wherein the network device database comprises network device information for each network device stored in the network device database.

6. The method of claim 1, wherein the first characteristic stored in the network device database indicates that the first network device is associated with a first service account, and wherein the second characteristic stored in the network device database indicates that the second network device is associated with the first service account.

7. The method of claim 1, further comprising:
receiving, at the datacenter, a third request for a connection address, the third request including a third device identifier associated with a third network device, wherein the third device identifier identifies the third network device from among the other network devices within the network device database;
looking up the third device identifier in the network device database to identify a third characteristic of the third network device associated with the third device identifier in the network device database;
determining that the third characteristic is not associated with the first characteristic or the second characteristic;
determining, based on the identified third characteristic not being associated with the first characteristic or the second characteristic, network-level settings optimized for the third network device based on the third characteristic of the third network device;
determining, based on the network-level settings optimized for the third network device, a second connection address that comprises the shared component and a second exclusive component;
sending the second connection address to the third network device; and
establishing, at the datacenter, a third connection with the third network device via the second connection address using the network-level settings optimized for the third network device.

8. The method of claim 7, further comprising:
associating the first connection address with a first hostname associated with a first white label entity; and
associating the second connection address with a second hostname associated with a second white label entity, wherein the first white label entity differs from the second white label entity.

9. The method of claim 7, wherein the first characteristic stored in the network device database indicates that the first network device is associated with a first service account, wherein the second characteristic stored in the network device database indicates that the second network device is associated with the first service account, and wherein the third characteristic stored in the network device database indicates that the third network device is associated with a second service account.

10. A method, comprising:
receiving, at a datacenter, a first connection request from a first voice over Internet Protocol (VoIP) device, wherein the first connection request comprises a first device identifier that identifies the first VoIP device from among other network VoIP devices within a network device database;
looking up the first device identifier in the network device database to identify a first plurality of device characteristics for the first VoIP device associated with the first device identifier in the network device database;
determining network-level settings optimized for the first VoIP device based on the first plurality of device characteristics;
identifying a first exclusive address component that is available at the datacenter;
customizing, at the datacenter, the first exclusive address component to provide the determined network-level settings optimized for the first VoIP device to network devices that establish a connection with the datacenter via the first exclusive address component;
associating the first exclusive address component with a shared address component to obtain a first connection address; and
sending the first connection address to the first VoIP device, which causes the first VoIP device to connect to the datacenter via the first connection address using the network-level settings optimized for the first VoIP device.

11. The method of claim 10, further comprising:
receiving, at the datacenter, a second connection request from a second VoIP device, wherein the second connection request comprises a second device identifier that identifies the second VoIP device from among the other network VoIP devices within the network device database;
looking up the second device identifier in the network device database to identify a second plurality of device characteristics for the second VoIP device associated with the second device identifier in the network device database;
determining network-level settings optimized for the second VoIP device based on the second plurality of device characteristics;
identifying a second exclusive address component that is available;
customizing, at the datacenter, the second exclusive address component to provide the determined network-level settings optimized for the second VoIP device to network devices that establish a connection with the datacenter via the second exclusive address component;
associating the second exclusive address component with the shared address component to obtain a second connection address; and
sending the second connection address to the second VoIP device, which causes the second VoIP device to connect to the datacenter via the second connection address using the network-level settings optimized for the second VoIP device.

12. The method of claim 11, wherein the first plurality of device characteristics differs from the second plurality of device characteristics, and wherein the network-level settings optimized for the first VoIP device differs from the network-level settings optimized for the second VoIP device.

13. The method of claim 12, wherein the first plurality of device characteristics corresponds to a first service account, wherein the second plurality of device characteristics corresponds to a second service account, and wherein the network-level settings optimized for the first VoIP device are based on the first service account and the network-level settings optimized for the second VoIP device are based on the second service account.

14. The method of claim 11, wherein the network-level settings optimized for the first VoIP device comprise settings stored in the network device database stored for the first device identifier, and wherein the settings specify a particular hostname, a relay timer time, and a retry count for the first VoIP device.

15. The method of claim 11, wherein the first plurality of device characteristics stored in the network device database for the first VoIP device and the second plurality of device characteristics stored in the network device database for the second VoIP device are associated with a same service account, and wherein the network-level settings optimized for the first VoIP device match the network-level settings optimized for the second VoIP device based on the first plurality of device characteristics and the second plurality of device characteristics being associated with the same service account.

16. The method of claim 11, wherein the first plurality of device characteristics stored in the network device database for the first VoIP device comprise a certificate identification.

17. The method of claim 11, wherein the first connection address causes the first VoIP device to display a first hostname, wherein the second connection address causes the second VoIP device to display a second hostname, and wherein the first hostname differs from the second hostname.

18. The method of claim 17, wherein the first hostname is associated with a first white label entity, wherein the second hostname is associated with a second white label entity, and wherein the first white label entity differs from the second white label entity.

19. A system, comprising:
   at least one processor; and
   at least one non-transitory computer readable storage medium storing instructions thereon that, when executed by the at least one processor, cause the system to:
      receive, at a datacenter, a first connection request from a first voice over Internet Protocol (VoIP) device, wherein the first connection request comprises a first device identifier that identifies the first VoIP device from among other network VoIP devices within a network device database;
      look up the first device identifier in the network device database to identify a first plurality of device characteristics for the first VoIP device associated with the first device identifier in the network device database;
      determine network-level settings optimized for the first VoIP device based on the first plurality of device characteristics;
      identify a first exclusive address component that is available;
      customize, at the datacenter, the first exclusive address component to provide the determined network-level settings optimized for the first VoIP device to network devices that establish a connection with the datacenter via the first exclusive address component;
      associate the first exclusive address component comprising an Internet Protocol address with a shared address component comprising a first port number to obtain a first connection address; and
      send the first connection address to the first VoIP device, which causes the first VoIP device to connect to the datacenter via the first connection address using the network-level settings optimized for the first VoIP device.

20. The system of claim 19, further comprising instructions thereon that, when executed by the at least one processor, cause the system to:
   identify, based on looking up the first device identifier in the network device database, a first hostname stored in the network device database for the first VoIP device; and
   providing the first hostname to the first VoIP device via the first connection address using the network-level settings optimized for the first VoIP device, which causes the first VoIP device to display hostname.

* * * * *